(12) United States Patent
Taguchi

(10) Patent No.: US 7,929,848 B2
(45) Date of Patent: Apr. 19, 2011

(54) VIBRATION DETECTION DEVICE, OPTICAL DEVICE, AND METHOD OF OPERATION OF VIBRATION DETECTION DEVICE

(75) Inventor: Fumiya Taguchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 811 days.

(21) Appl. No.: 11/703,792

(22) Filed: Feb. 8, 2007

(65) Prior Publication Data

US 2007/0201848 A1    Aug. 30, 2007

(30) Foreign Application Priority Data

Feb. 14, 2006  (JP) .................................. 2006-036364
Mar. 30, 2006  (JP) .................................. 2006-093684

(51) Int. Cl.
*G03B 17/00*    (2006.01)
(52) U.S. Cl. ......................................................... 396/55
(58) Field of Classification Search ................ 396/52–55
See application file for complete search history.

(56) References Cited

U.S. PATENT DOCUMENTS

| | | | |
|---|---|---|---|
| 5,546,159 A | | 8/1996 | Imura et al. |
| 5,805,937 A | * | 9/1998 | Kitagawa ........................ 396/55 |
| 6,163,651 A | * | 12/2000 | Washisu et al. ................. 396/55 |
| 6,278,842 B1 | | 8/2001 | Yamazaki et al. |
| 6,330,398 B1 | * | 12/2001 | Tanaka et al. ................... 396/53 |
| 6,630,950 B1 | | 10/2003 | Ohkawara et al. |
| 2004/0052513 A1 | | 3/2004 | Ohkawara et al. |

FOREIGN PATENT DOCUMENTS

| | | |
|---|---|---|
| EP | 1 577 705 A1 | 9/2005 |
| JP | A-05-107623 | 4/1993 |
| JP | A-05-249529 | 9/1993 |
| JP | A-6-230447 | 8/1994 |
| JP | A-07-181538 | 7/1995 |
| JP | A 7-203285 | 8/1995 |
| JP | A-07-270847 | 10/1995 |
| JP | A-09-061870 | 3/1997 |
| JP | 2000-39637 A * | 2/2000 |
| JP | A 2004-146659 | 5/2004 |
| JP | A-2004-153503 | 5/2004 |
| JP | A-2004-219548 | 8/2004 |
| JP | A-2004-295027 | 10/2004 |
| JP | A-2005-202261 | 7/2005 |
| WO | WO 2007/032334 A1 | 3/2007 |

* cited by examiner

*Primary Examiner* — W. B. Perkey
(74) *Attorney, Agent, or Firm* — Oliff & Berridge, PLC

(57) ABSTRACT

A vibration detection device provided with a vibration detection sensor 51A (51B) that outputs a detection signal corresponding to a detected vibration, a wave filter 52A (52B) that filters a detection signal in accordance with a cut-off frequency, and a controller (64) for changing the cut-off frequency of the wave filter.

25 Claims, 9 Drawing Sheets

VIBRATION DETECTION DEVICE, OPTICAL DEVICE, AND METHOD OF OPERATION OF VIBRATION DETECTION DEVICE

BACKGROUND OF THE INVENTION

1. Field of the Invention

The present invention relates to a vibration detection device, optical device, and method of operation of vibration detection device.

2. Description of the Related Art

As technology for antivibration control for reducing the effects of vibration occurring at a camera due to hand-shake, it is known to provide an angular velocity sensor for detecting vibration in the pitch direction and an angular velocity sensor for detecting vibration in the yaw direction and to drive optical members in accordance with detection outputs from the two sensors so as to suppress vibration of the image of the subject formed on the image sensor. As related art, for example, Japanese Patent Publication (A) No. 7-203285 is known.

Further, a camera not only suffers from vibration due to hand-shake etc., but also vibration caused by the camera itself. For example, when a quick return mirror, shutter, aperture, etc. is driven inside the camera, the vibration of that drive operation becomes noise.

Further, as related art, a lens barrel configured with two vibration sensors mounted on a hard board formed into an arc shape and transmitting signals of the vibration detection sensors to a lens CPU provided outside of this board is known, but with this configuration, reduction in size was difficult. As related art, for example, Japanese Patent Publication (A) No. 2004-146659 is known.

SUMMARY OF THE INVENTION

An object of the present invention is to provide a vibration detection device and optical device able to reduce the effect of vibration and a method of operation of a vibration detection device.

To achieve the above object, according to a first aspect of the present invention, there is provided a vibration detection device provided with a vibration detection sensor that outputs a detection signal corresponding to a detected vibration, a wave filter that filters the detection signal in accordance with a cut-off frequency, and a cut-off frequency controller that changes the cut-off frequency of the wave filter.

BRIEF DESCRIPTION OF THE DRAWINGS

Below, the present invention will be explained in further detail based on the illustrated embodiments, wherein.

DESCRIPTION OF THE PREFERRED EMBODIMENTS

Below, the best mode for carrying out the present invention will be described with reference to the drawings.

Embodiment 1

Figure 1:
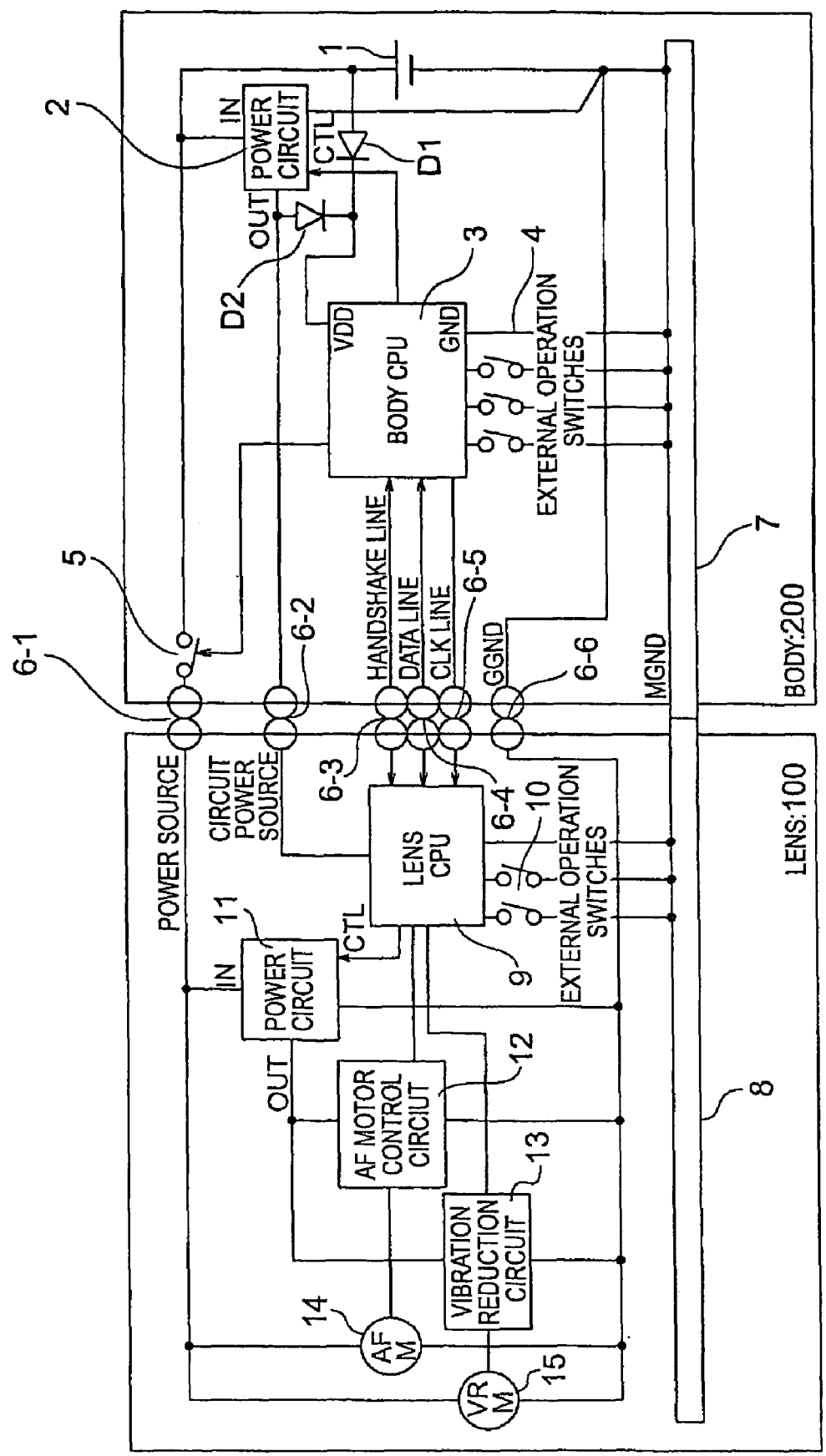
FIG. 1 is a block diagram for explaining a camera system according to an embodiment of the present invention.

FIG. 1 is a block diagram for explaining a camera system according to an embodiment of the present invention. The camera system of the present embodiment is comprised of a camera body 200 and a lens barrel 100 attached to a lens mount (not shown) of a camera body 200 as an interchangeable lens.

The lens barrel 100 has electrical circuits in the housing 8, while the camera body 200 has electrical circuits in the housing 7. When the lens barrel 100 is attached to the camera body 200, the electrical circuits on the lens barrel 100 side and the electrical circuits on the camera body 200 side are connected through the electrical contacts 6-1 to 6-6. Further, the housing 8 and housing 7 are electrically connected through a not shown lens mount.

The electrical circuits of the lens barrel 100 include a lens CPU 9, external operation switches 10, power circuit 11, AF motor control circuit 12, vibration reduction circuit 13, AF (Auto Focus) motor 14, and VR (vibration reduction) motor 15. The VR motor 15 shows the later explained VR motor 15A and VR motor 15B together.

The electrical circuits of the camera body 200 include a power circuit 2, body CPU 3, external operation switches 4, power feed switch 5, and diodes D1 and D2. A battery 1 is loaded in the camera body 200 as a power source.

Camera Body

The battery 1 loaded in the camera body 200 feeds power to the camera body 200 and lens barrel 100. The power circuit 2 is turned on/off in accordance with a signal (CTL) sent from the body CPU 3. When on, it outputs the voltage of the battery 1 input through an input terminal (IN) to an output terminal (OUT).

Due to this, when the power circuit 2 is on, voltage from the battery 1 is supplied through the diode D2 to the body CPU 3 and, as the circuit power source on the lens barrel 100 side, is supplied through the electric contact 6-2 to the lens CPU 9. Since the voltage from the battery 1 is supplied to the body CPU 3 even by a path through the diode D1, the body CPU 3 starts up at the point of time when the battery 1 is loaded. The negative electrode of the battery 1 is connected through an electric contact 6-6 between the camera body 200 and lens barrel 100.

The power feed switch 5 is turned on/off in accordance with a power feed instruction sent from the body CPU 3. Due to this, when the power feed switch 5 is on, voltage from the battery 1 is supplied as a power through the electric contact 6-1 to the power circuit 11, AF motor 14, and VR motor 15 at the lens barrel 100 side.

The external operation switches 4 include a halfway depression switch, full depression switch, etc. and output operation signals corresponding to the switch operations to the body CPU 3. The halfway depression switch is turned on/off linked with the amount of depression of a not shown shutter button. When the amount of depression reaches the amount of halfway depression operation, the switch is turned on, while when it does not reach the amount of halfway depression, it is turned off. The full depression switch is turned on when the amount of depression of the shutter button reaches an amount of full depression operation larger than the amount of halfway depression operation and is turned off when it does not reach the amount of full depression operation.

The body CPU 3 performs exposure processing and autofocus (AF) processing when the halfway depression switch is turned on and controls the imaging when the full depression switch is turned on. The body CPU 3 further communicates with the lens CPU 9 after the AF processing. The communication lines with the lens CPU 9 include a hand-shake line, DATA line, and CLK line. The lines are connected through the electric contacts 6-3, 6-4, and 6-5 with the lens CPU 9. The content sent by the body CPU 3 to the lens CPU 9 includes the amount of movement, movement direction, and movement start instruction of the focus optical system calculated by the AF processing and also the later explained disturbance information etc.

Lens Barrel

The power circuit 11 is turned on/off in accordance with a signal (CTL) sent from the lens CPU 9. When on, it outputs the power input from the input terminal (IN) to the output terminal (OUT). Due to this, when the power circuit 11 is on, power is supplied to the AF motor control circuit 12 and vibration reduction circuit 13. Note that voltage from the battery 1 is supplied to the AF motor 14 and VR motor 15. When the AF motor 14 and VR motor 15 are still operable yet output of power by the electrical circuit 11 stops for some reason or another, the AF motor 14 and VR motor 15 are automatically cut off from the path of power fed from the battery 1.

The lens CPU 9 is started up when circuit power is supplied from the camera body 200. The lens CPU 9 not only communicates with the body CPU 3, but also sends instructions to the AF motor control circuit 12 and controls operation of the AF motor 14. The AF motor control circuit 12 starts the drive of the AF motor 14 in accordance with data sent from the body CPU 3 and uses a detection signal from a detection device (not shown) to detect the amount of movement of a focus optical system (not shown) for adjustment of focus.

The AF motor 14 is the drive source for making the focus optical system advance and retract in the optical axis direction. The AF motor control circuit 12 generates drive voltage so that the amount of movement of the focus optical system matches the instructed amount of movement and supplies this drive voltage to the AF motor 14. Due to the operation of the AF motor 14, the focus optical system is moved to the focus position where a sharp image of the main subject is formed on a not shown photosensitive member.

The lens CPU 9 further sends instructions to the vibration reduction circuit 13 to control the drive operation of the VR motor 15. The vibration reduction circuit 13 calculates the amount of vibration of the image of the subject formed on the photosensitive member in accordance with the instruction from the lens CPU 9 and drives the VR motor 15 in accordance with the amount of vibration.

The VR motor 15 is a drive source for making a hand-shake reduction optical system (not shown) advance and retract in a direction perpendicular to the optical axis direction. The vibration reduction circuit 13 generates a drive voltage for canceling out the calculated amount of vibration and applies this drive voltage to the VR motor 15. Due to the drive operation of the VR motor 15, the hand-shake reduction optical system moves and relative vibration of the subject on the photosensitive member due to vibration of the lens barrel 100 (that is, the camera system) is suppressed.

The external operation switches 10 include a manual focus switch, focus limit switch, antivibration mode switch, etc. and outputs operation signals corresponding to the switch operations to the lens CPU 9. The manual focus switch is a switch operated when user adjusts the focus by manual operation, while the focus limit switch is a switch operated in accordance with the distance to the subject covered by the AF operation. Further, the antivibration mode switch is a switch operated in accordance with the state of hand-shake envisioned.

The vibration reduction circuit 13 of the present embodiment will be explained in further detail next. In the present embodiment, hand-shake (vibration) of the lens barrel 100 in the pitch direction and yaw direction is detected by two vibration reduction systems independently in parallel so as to suppress shaking of the subject due to vibration in the respective directions.

Figure 2:
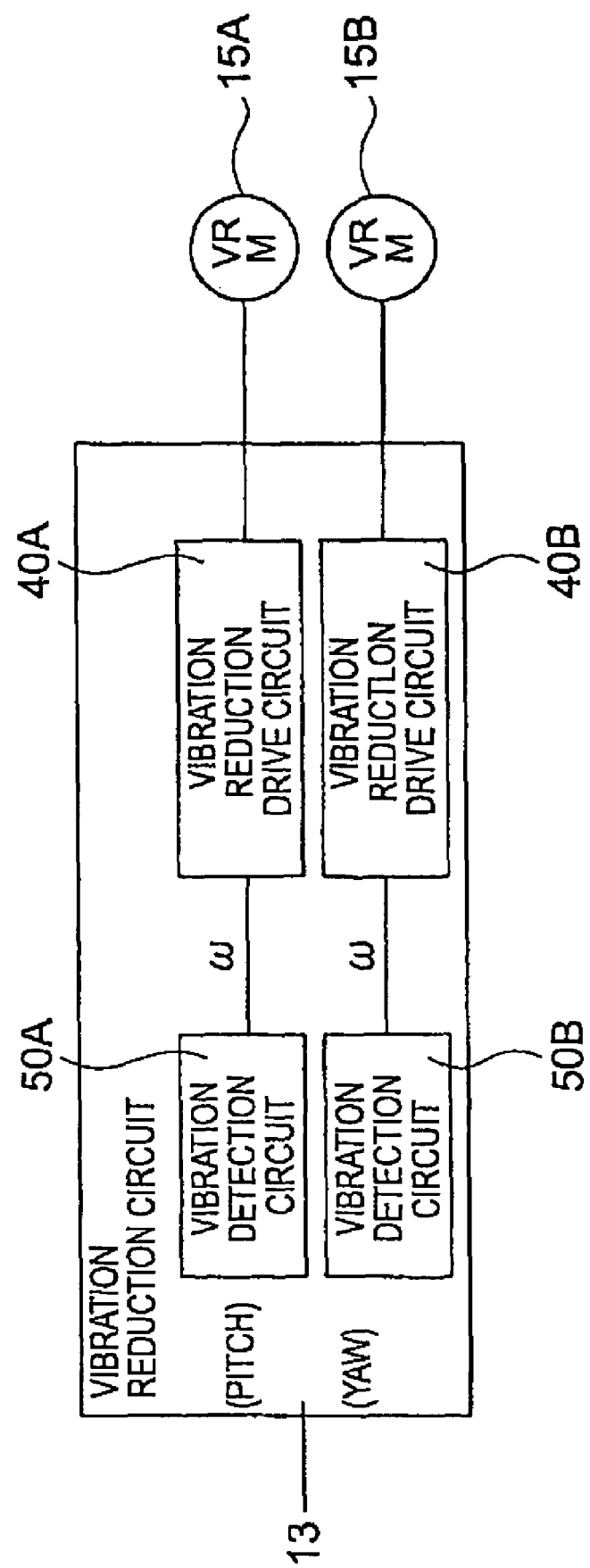
FIG. 2 is a block diagram for explaining the configuration of a vibration reduction circuit shown in FIG. 1.

FIG. 2 is a block diagram for explaining the configuration of the vibration reduction circuit 13. In FIG. 2, the vibration reduction circuit 13 has a vibration detection circuit 50A for detecting vibration of the camera system in the pitch direction, vibration reduction drive circuit 40A for driving a VR motor 15A in accordance with the vibration in the pitch direction, vibration detection circuit 50B for detecting vibration of the camera system in the yaw direction, and a vibration reduction drive circuit 40B for driving a VR motor 15B in accordance with the vibration in the yaw direction.

Figure 3:
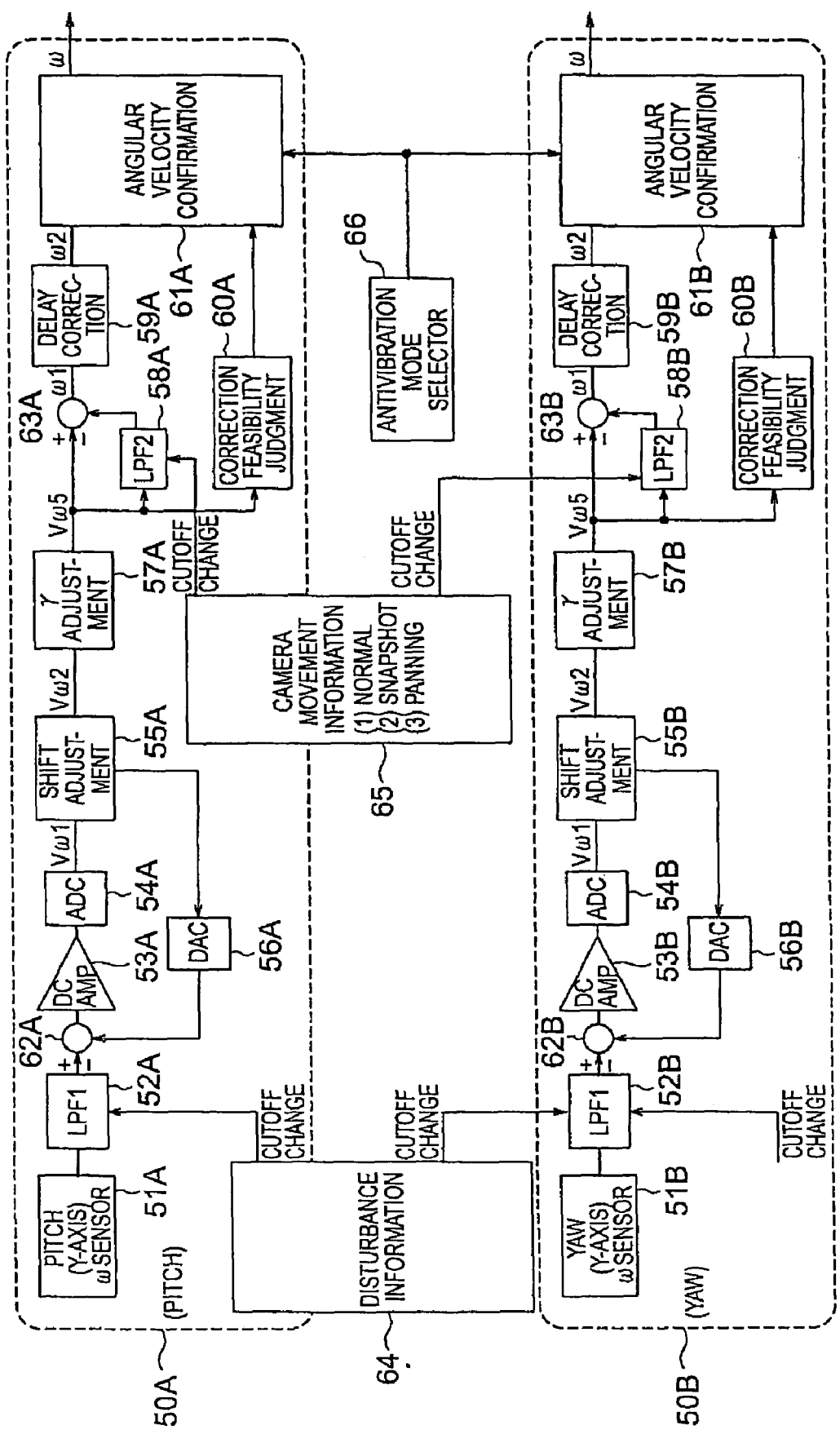
FIG. 3 is a view for explaining in further detail the vibration detection circuit shown in FIG. 1.

FIG. 3 is a view for explaining the vibration detection circuit 50A and vibration detection circuit 50B in further detail. The vibration detection circuit 50A has an angular velocity sensor 51A first low pass filter (LPF) 52A, subtractor 62A, DC amplification circuit 53A, A/D conversion circuit 54A, shift adjustment circuit 55A, D/A conversion circuit 56A, gamma adjustment circuit 57A, second low pass filter (LPF) 58A, delay correction circuit 59A, correction feasibility judgment circuit 60A, and angular velocity confirmation circuit 61A and obtains control information from a disturbance information output circuit 64, camera movement information output circuit 65, and antivibration mode selector 66.

The angular velocity sensor 51A is comprised of a gyrosensor and converts an angular velocity of the lens barrel 100 (that is, the camera system) in the pitch direction to an electrical signal. The detection electrical signal of the angular velocity sensor 51A is input to a first low pass filter (LPF) 52A. The first low pass filter (LPF) 52A passes the signal of the frequency component lower than a set cut-off frequency in the input signal and outputs it to the subtractor 62A. Since the first low pass filter (LPF) 52A reduces the signal of the frequency carponent higher than the cut-off frequency, it can remove aliasing noise and noise generated by the angular velocity sensor 51A.

The first low pass filter (LPF) 52A can change the cut-off frequency in accordance with a cut-off change signal input from a disturbance information output circuit 64. For example, when the normal cut-off frequency is for example 500 Hz, it is configured to lower the cut-off frequency in accordance with the cut-off change signal to for example 50 Hz.

The subtractor 62A subtracts the output signal of the later explained D/A conversion circuit 56A from the output signal of the first low pass filter (LPF) 52A and outputs the resultant signal to the DC amplification circuit 53A. The DC amplification circuit 53A amplifies the input signal by a predetermined amplification rate (for example, tens to hundreds fold) and outputs the amplified signal to the A/D conversion circuit

54A. The A/D conversion circuit 54A converts the input signal to a digital signal $V\omega 1$. The converted digital signal $V\omega 1$ is adjusted in DC component by the shift adjustment circuit 55A and is sent as a digital signal $V\omega 2$ to the gamma adjustment circuit 57A.

The shift adjustment circuit 55A monitors the digital signal $V\omega 1$ and, when the DC component of the signal is separated by a predetermined amount from the center value of the dynamic range of the circuit, generates feedback data for returning the above DC component to the center value and outputs it to the D/A conversion circuit 56A. The D/A conversion circuit 56A converts the input data to an analog signal which is then output to the subtractor 62A.

The gamma adjustment circuit 57A corrects variations in gain due to individual differences in the angular velocity sensor 51A and variations in gain due to individual differences in other circuits such as the DC amplification circuit 53A and outputs the corrected signal $V\omega 5$ to the subtractor 63A.

The second low pass filter (LPF) 58A pseudo-calculates the long-term average of the detection electrical signal of the angular velocity sensor 51A. By passing, in the signal $V\omega 5$ input from the gamma adjustment circuit 57A, a signal of the frequency component lower than the cut-off frequency set at the second low pass filter (LPF) 58A (for example, several Hz or less), only the signal of the low frequency component caused during panning is output to the subtractor 63A.

The subtractor 63A subtracts the output signal of the second low pass filter (LPF) 56A from the output signal of the gamma adjustment circuit 57A and outputs the signal $\omega 1$ after subtraction to the delay correction circuit 59A. Due to this, the low frequency component due to the above panning can be removed from the detection electrical signal of the angular velocity sensor 51A.

The second low pass filter (LPF) 58A is configured to enable the cut-off frequency to be changed in accordance with a cut-off change signal input from the camera movement information output circuit 65.

The delay correction circuit 59A corrects delay factors of the angular velocity sensor 51A and other circuits and outputs the signal $\omega 2$ after delay correction to the angular velocity confirmation circuit 61A. The correction feasibility judgment circuit 60A monitors the output signal $V\omega 5$ of the gamma adjustment circuit 57A and judges if correction is possible. When judging the correction is not possible, it instructs suspension of vibration reduction to the angular velocity confirmation circuit 61A. Note that instead of suspension, it is also possible to configure the system to instruct suppression of the amount of vibration reduction.

The antivibration mode selector 66 switches between the large/small levels of hand-shake covered by the correction according to the state of operation of the above-mentioned antivibration mode switch. In the case of "large", it outputs an instruction for increasing the gain to the angular velocity confirmation circuit 61A, while in the case of "small", it outputs an instruction for reducing the gain to the angular velocity confirmation circuit 61A.

The angular velocity confirmation circuit 61A determines the angular velocity signal $\omega$ based on the signal $\omega 2$ after correction of delay by the delay correction circuit 59A, instructions from the correction feasibility judgment circuit 60A, and gain instructions from the antivibration mode selector 66 and outputs the determined angular velocity signal $\omega$ to the vibration reduction drive circuit 40A (FIG. 2). The vibration reduction drive circuit 40A generates a drive voltage corresponding to the angular velocity signal $\omega$ and supplies it to the VR motor 15A.

The disturbance information output circuit 64 outputs a cut-off change signal in accordance with the timing signal sent from the body CPU 3 to the first low pass filter (LPF) 52A. Due to this, the first low pass filter (LPF) 52A receives as input a cut-off change signal in synchronization with the timing at which the mirror (FIG. 4) or shutter (not shown) at the camera body 200 side is driven.

The camera movement information output circuit 65 judges movement of the camera system based on the angular velocity signal $\omega$ determined by the angular velocity confirmation circuit 61A and angular velocity confirmation circuit 61B. When judging that the camera system is in the normal shooting state or snapshot or panning of shutter button SW (see FIG. 4), it outputs a cut-off change signal in accordance with the result of judgment to the second low pass filter (LPF) 58A. Due to this, the second low pass filter (LPF) 58A receives as input a cut-off change signal in accordance with movement of the camera system. Note that this differs in cut-off frequency from the first low pass filter (LPF) 52A designed for removing noise.

The vibration detection circuit 50B has an angular velocity sensor 51B, first low pass filter (LPF) 52B, subtractor 62B, DC amplification circuit 53B, A/D conversion circuit 54B, shift adjustment circuit 55B, D/A conversion circuit 56B, gamma adjustment circuit 57B, second low pass filter (LPF) 58B, delay correction circuit 59B, correction feasibility judgment circuit 60B, and angular velocity confirmation circuit 61B and obtains control signals from a disturbance information output circuit 64, camera movement information output circuit 65, and antivibration mode selector 66.

The disturbance information output circuit 64, camera movement information output circuit 65, and antivibration mode selector 66 are shared by the vibration detection circuit 50A and vibration detection circuit 50B. The operation of the vibration detection circuit 50B is similar to that of the vibration detection circuit 50A, so a detailed description will be omitted.

Figure 4:
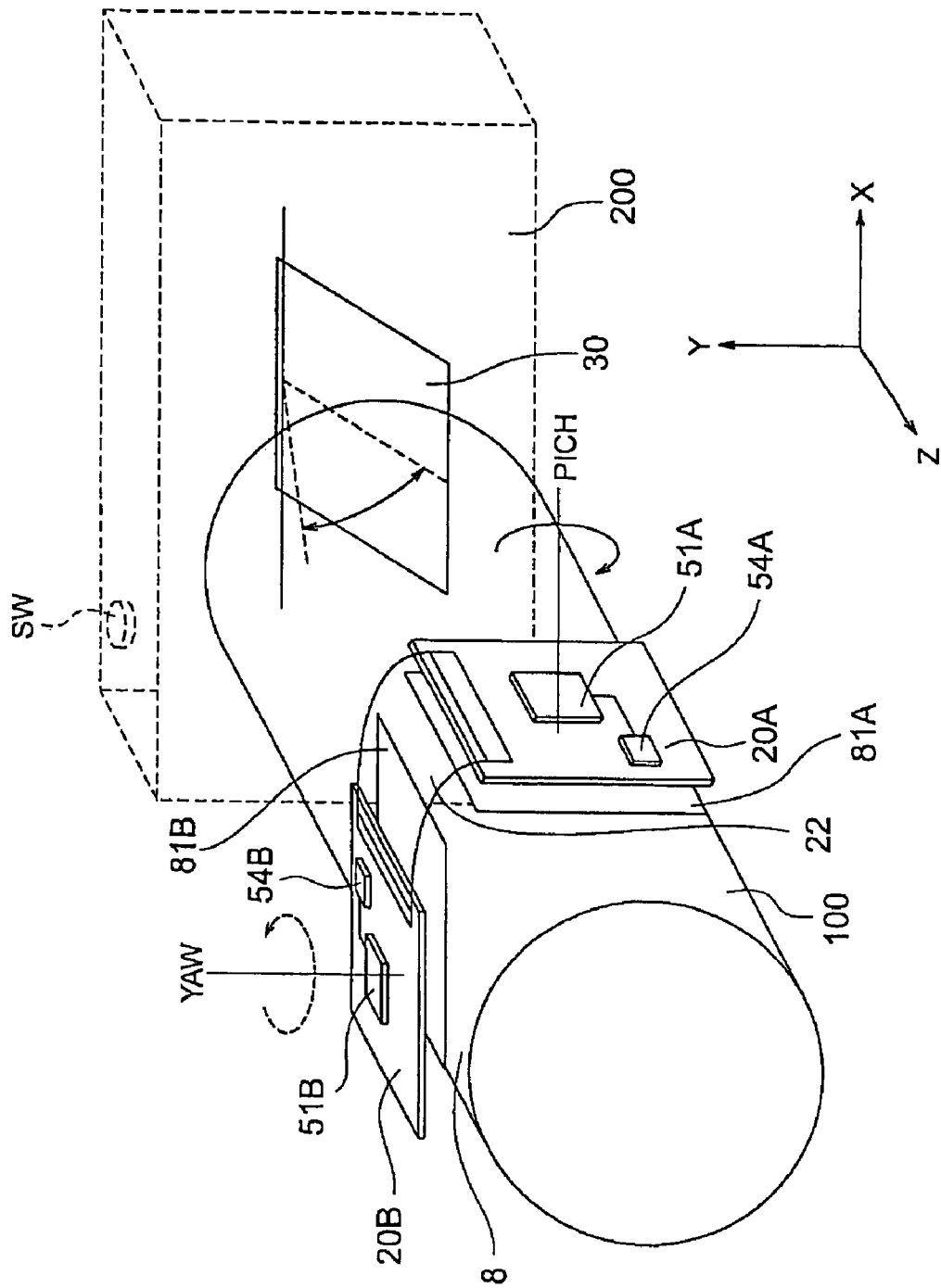
FIG. 4 is a view for explaining positions of disposition of angular velocity sensors in a lens barrel.

FIG. 4 is a view for explaining the disposition of the angular velocity sensor 51A and angular velocity sensor 51B in the lens barrel 100. In FIG. 4, the board 20A mounts a vibration detection circuit 50A formed by an angular velocity sensor 51A, A/D conversion circuit 54A, etc. The board 20B mounts a vibration detection circuit 50B formed by an angular velocity sensor 51B, A/D conversion circuit 54B, etc.

The angular velocity sensor 51A is provided with a mounting part for mounting on a board in a direction perpendicular to the angular velocity detection sensitivity axis and is mounted on the board 20A so that the angular velocity detection sensitivity axis is perpendicular to the board 20A. The angular velocity sensor 51B is provided with a mounting part for mounting on a board in a direction perpendicular to the angular velocity detection sensitivity axis and is mounted on the board 20B so that the angular velocity detection sensitivity axis becomes perpendicular to the board 20B.

The angular velocity sensors 51A, 51B are described in an International Application WO00/08011 filed Sep. 12, 2006 (PCT/JP2006/318035) by the present applicant. This application incorporates by reference the description in No. WO00/08011 filed Sep. 12, 2006 (PCT/JP2006/318035).

The housing 8 of the lens barrel 100 is formed with a surface 81A perpendicular to the X-direction and a surface 81B perpendicular to the Y-direction. The surface 81A has the board 20A directly mounted onto it, while the surface 81B has the board 20B directly mounted onto it.

Therefore, the angular velocity sensors 51A, 51B mounted on the board 20A and board 20B have angular velocity detection sensitivity axes perpendicular to the optical axis (Z-direction) and can detect the angular velocity precisely.

In the illustrated embodiment, the surface 81A and the board 20A don't have a cushioning member (for example, a damper member for absorbing vibration given to the lens barrel) etc. provided between them, so the board 20A will not become inclined with respect to the surface 81A. Accordingly, the surface 81A and board 20A can be disposed in parallel. For this reason, regardless of the balance of centers of gravities of the parts mounted on the board 20A such as the angular velocity sensor 51A and A/D conversion circuit 54A, the angular velocity detection sensitivity axis (X-direction) of the angular velocity sensor 51A can be made to perpendicularly intersect the optical axis (Z-direction). The same is true for the angular velocity sensor 51B.

Further, in the illustrated embodiment, so long as the board 20A and the board 20B are provided in parallel to the surface 81A and surface 81B, no matter where the angular velocity sensors 51A, 51B are disposed at the surface 81A and surface 81B, the angular velocity detection sensitivity axes will become perpendicular to the optical axis and good detection characteristics will be obtained. For this reason, when mounting the angular velocity sensors, it is no longer necessary to position them with a high precision as regards to the positions on the surface 81A and surface 81B and the angle about the angular velocity detection sensitivity axis, so the sensors can be easily mounted on the surface 81A and surface 81B.

In the illustrated embodiment, since the board 20A and board 20B are provided in parallel to the optical axis (Z-direction), even if the boards 20A and board 20B are large in size, the size in the direction perpendicular to the optical axis (Z-direction) will not change. For this reason, enlargement of the hardware as a whole can be avoided while enlarging the board 20A and board 20B.

Further, since the board 20A and board 20B mount the angular velocity sensors 51A, 51B and the A/D conversion circuits 54A, 54B for digitalizing the analog signals output from the angular velocity sensors, the wiring patterns from the angular velocity sensors 51A, 51B to the A/D conversion circuits can be shortened and the noise of the analog signals can be reduced by that extent.

Further, in the illustrated embodiment, the surface 81A and surface 81B on which the angular velocity sensors are mounted are not curved surfaces, but flat surfaces, so it is possible to reliably mount the angular velocity sensors.

Note that when disposing the board 20A or board 20B on the surface 81A or the surface 80B, the invention is not limited to a binder. It is also possible to use a means such as soldering, attachment by two-sided adhesive tape, etc.

The board 20A and the board 20B are connected via a board 22. The board 22 is for example a flexible board. The disturbance information output circuit 64, camera movement information output circuit 65, and antivibration mode selector 66 are mounted for example on one of the board 20A and board 20B.

The angular velocity sensors 51A, 51B of the embodiment shown in FIG. 4 are weak against acceleration like disturbances occurring in a direction perpendicular to the detection sensitivity axis compared with the direction of the detection sensitivity axis. In this case, if the quick return mirror 30 of the camera body 200 at the time of shooting is pivoted in the arrow direction, the vibration of the drive operation of the quick return mirror 30 is transmitted through the lens barrel 100 to the board 20A as a disturbance and is detected by the angular velocity sensor 51A. This detection signal is for example input as noise of about 150 Hz from the angular velocity sensor 51A to the first low pass filter (LPF) 52A. On the other hand, the pivot direction of the quick return mirror 30 corresponds to the direction of the detection sensitivity axis of the angular velocity sensor 51B, so the angular velocity sensor 51B does not detect the vibration of the drive operation of the quick return mirror 30.

Therefore, if, at the time of shooting, a cut-off change signal for changing the cut-off frequency of the first low pass filter (LPF) 52A to be lower than the frequency of the above noise is output from the disturbance information output circuit 64 before the quick return mirror 30 is driven, the above disturbance noise can be removed by the first low pass filter (LPF) 52A.

Figure 5:
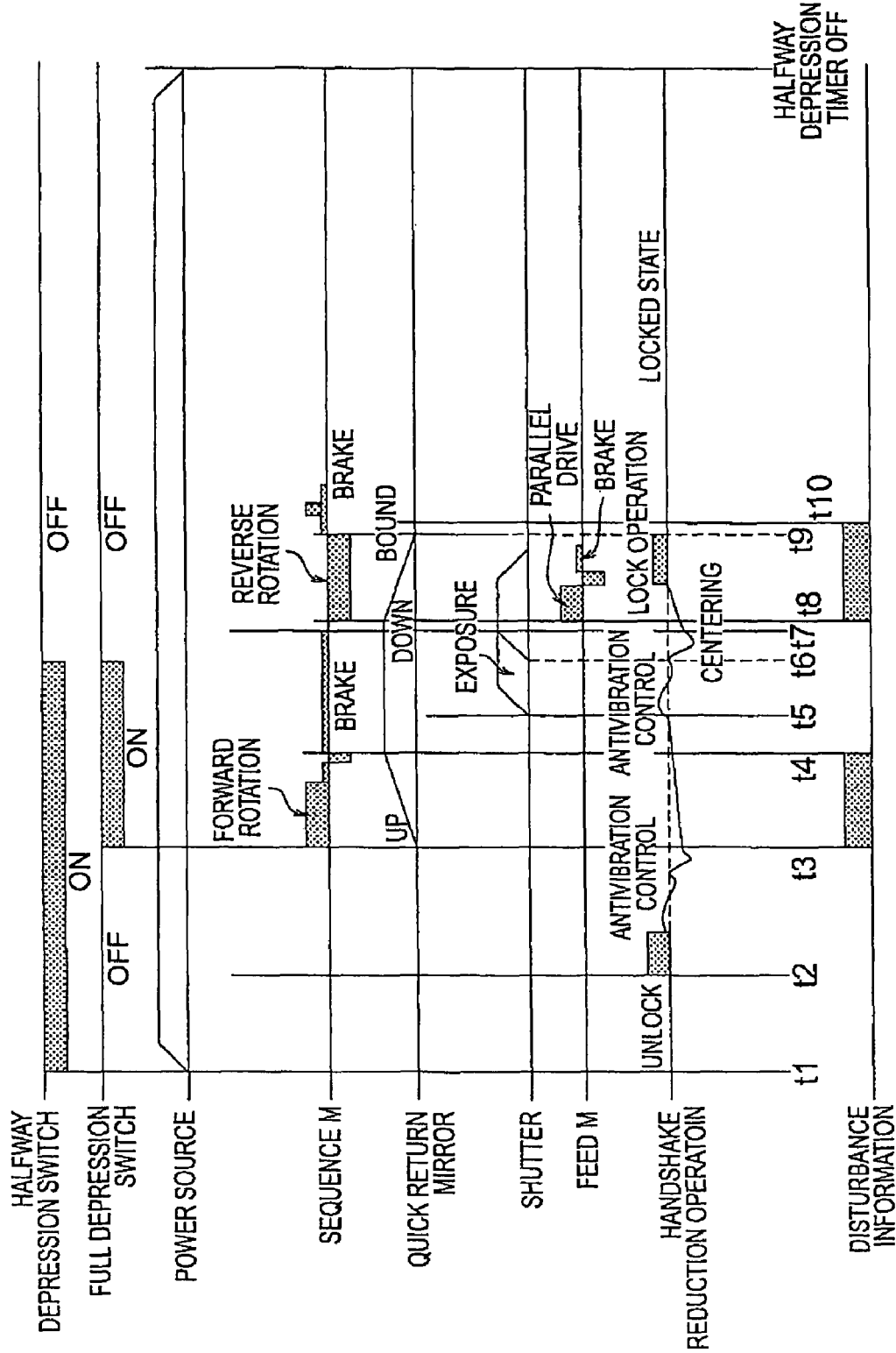
FIG. 5 is a view for explaining a timing of input of a cut-off change signal for a first low pass filter.

The timing of input of the cut-off change signal to the first low pass filter (LPF) 52A explained above will be explained with reference to the time chart of FIG. 5. FIG. 5 shows an example of removing disturbance noise caused by the drive operation of the quick return mirror 30.

If the halfway depression switch is turned on at the timing t1, the body CPU 3 starts the halfway depression timer phase. Due to this, the camera body 200 starts to supply the lens barrel 100 with power. The lens CPU 9 makes the AF motor control circuit 12 and vibration reduction circuit 13 start their initialization phases for initializing their circuits. The halfway depression timer phase is continued until the time counted by the halfway depression timer reaches a predetermined time (halfway depression timer turns off). The initialization phase is continued until the circuits finish being initialized.

At the timing t2 after the initialization phase, the lens CPU 9 unlocks the lens and makes the vibration reduction circuit 13 begin control to prevent vibration. Due to this, the VR motor 15A drives the vibration reduction optical system in the pitch direction in accordance with the vibration in the pitch direction, and the VR motor 15B drives the vibration reduction optical system in the yaw direction in accordance with the vibration in the yaw direction. Note that the focus is also adjusted by the AF motor control circuit 12.

If the full depression switch is turned on at the timing t3, the body CPU 3 starts the shooting sequence. Specifically, it outputs an instruction to a shutter control circuit (not shown) to hold the front curtain and rear curtain of the shutter. The body CPU 3, further, makes the sequence motor forming a sequence system (not shown) operate forward. Due to this, mirror up motion of the quick return mirror 30 and closing of the aperture (not shown) are started.

The body CFU 3 brakes the sequence motor to make the forward rotation stop at the timing t4 when the mirror up ends. At the timing t5 after mirror up motion, the body CPU 3 outputs an instruction to the shutter control circuit (not shown) to release the hold on the front curtain of the shutter. Due to this, the shutter front curtain starts to move and object light strikes the photosensitive member. At the timing t6 when a time corresponding to the control shutter time elapses, the body CPU 3 outputs an instruction to the shutter control circuit to release the hold on the rear curtain of the shutter. Due to this, the shutter rear curtain starts to move and object light is blocked from the striking the photosensitive member.

At the timing t7 when the exposure ends, the body CPU 3 instructs the vibration reduction circuit 13 to center the vibration reduction optical system when the halfway depression switch is off. Due to this, the VR motor 15A and VR motor 15B drive the vibration reduction optical system to the initial position (for example, the center position of the movable range). The vibration reduction optical system is fixed in place in the state of the initial position (lens lock). Note that when the halfway depression switch continues on, control for prevention of vibration is continued.

At the timing t8 a predetermined time after the timing t7, the body CPU 3 makes the sequence motor start to operate in reverse and makes the feed motor start the feed. Due to this, mirror down motion of the quick return mirror 30 and release and reset of the aperture (not shown) are started. The body CPU 3 brakes the sequence motor and makes it stop operating in reverse at the timing t9 when the mirror down motion finishes. On the other hand, the feed motor (not shown) is braked after being driven a predetermined amount and feeds a predetermined amount of the photosensitive member (film).

In the above explained shooting sequence, the body CPU 3 sends disturbance information to the lens CPU 9 in the period from the timing t3 to timing t4 and the period from the timing t8 to timing t10. The period from the timing t8 to timing t10 includes the time required for convergence of the mirror bound motion after the mirror down motion. Receiving the disturbance information, the lens CPU 9 sends an instruction to the disturbance information output circuit 64 and makes it output a cut-off change signal to the first low pass filter (LPF) 52A while receiving disturbance information.

According to the embodiment explained above, the following action and effects are obtained:

(1) The antivibration control of the camera system (200, 100) uses the detection signal of an angular velocity sensor 51A (51B) to determine the angular velocity ω for vibration reduction. In general, if broadening the frequency bandwidth of the vibration detection signal, the response in the antivibration control is improved, but the S/N ratio falls and broadband circuit parts become required thereby incurring a rise in part costs. In the present embodiment, the cut-off frequency (for example, 500 Hz) of the first low pass filter (LPF) 52A (52B) under normal circumstances is made higher than the frequency for prevention of vibration due to hand-shake (for example, 1 Hz to 15 Hz or so), so it is possible to secure response in vibration reduction under normal circumstances while keeping down the drop in the S/N ratio and the part costs.

(2) When the vibration at the time of the drive operation of the quick return mirror 30 (for example, 150 Hz) is transmitted from the camera body 200 to the lens barrel 100, the cut-off frequency of the first low pass filter (LPF) 52A (52B) is changed (for example, to 50 Hz), so even if the angular velocity sensor 51A (51B) detects mirror vibration, it can be removed by the first low pass filter (LPF) 52A (52B). As a result, the angular velocity ω for vibration reduction is determined based on the vibration detection signal minus the frequency component due to mirror vibration (disturbance noise), so hand-shake can be stably reduced.

(3) While lowering the cut-off frequency of the first low pass filter (LPF) 52A (52B) (for example, to 50 Hz), sequential control is performed based on the disturbance information sent from the body CPU 3 to the lens CPU 9 side, so it is possible to keep this period down to the minimal period including the drive time of the quick return mirror 30. Due to this, the response in the antivibration control will not be reduced more than necessary.

(4) The period from the timing t8 to the timing t10 includes the time required for the mirror bound motion after the mirror down motion, so it is possible to reliably remove disturbance noise due to mirror vibration.

(5) In the present embodiment, it is possible to change the cut-off frequency so as to remove the disturbance noise due to mirror vibration, so it is possible to eliminate the damper member for absorption of the vibration of the quick return mirror 30, possible to reduce the size, and possible to reduce the size and reduce the cost of the hardware as a whole.

Embodiment 2

Figure 6:
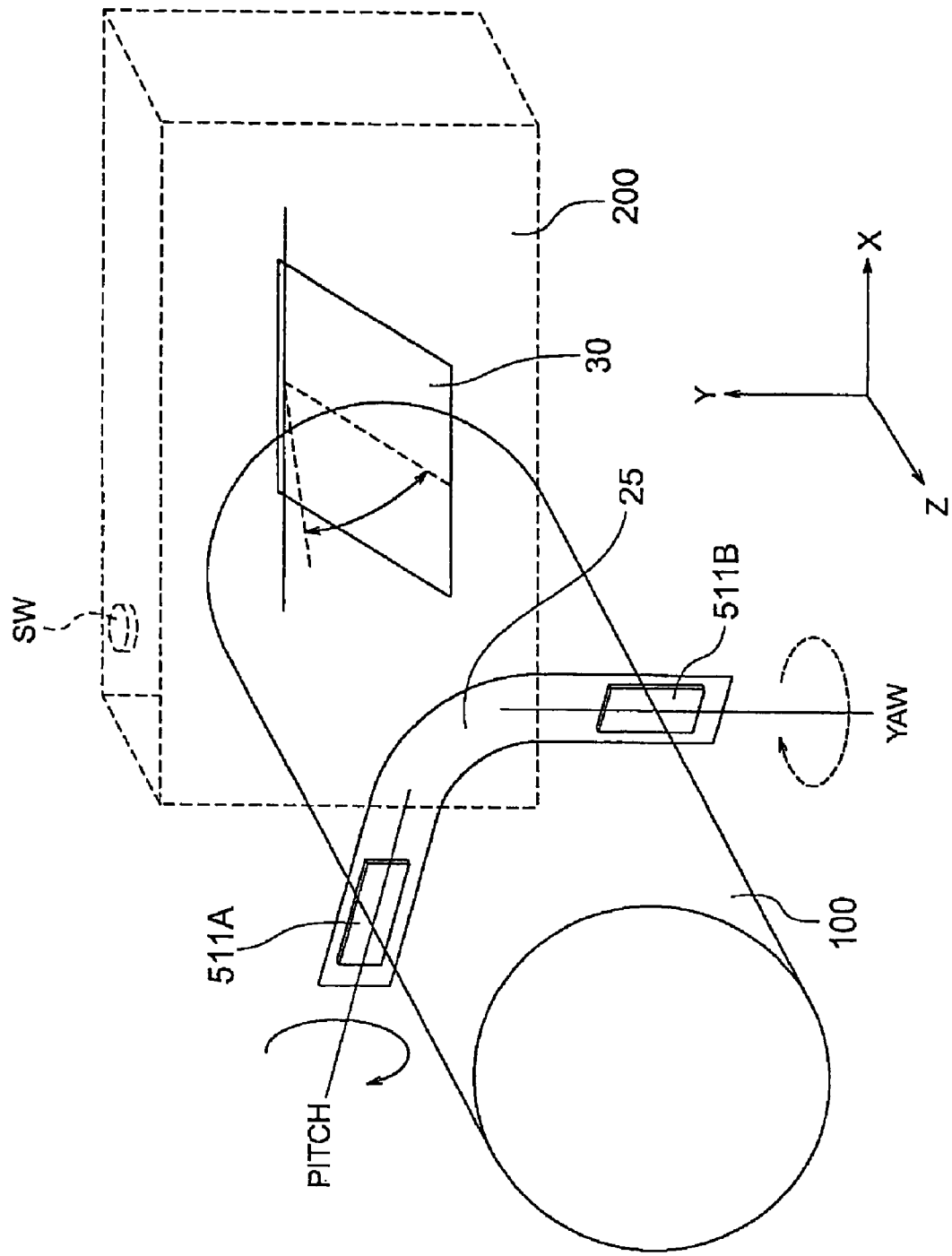
FIG. 6 is a view for explaining other positions of disposition of angular velocity sensors in a lens barrel.

FIG. 6 is a view explaining another example of disposition of the angular velocity sensors at the lens barrel 100 of a second embodiment of the present invention. In FIG. 6, the board 25 is provided in a direction perpendicular to the optical axis (Z-direction).

The board 25 mounts a vibration detection circuit 50A formed by an angular velocity sensor 511A and A/D conversion circuit (not shown) etc. and mounts a vibration detection circuit 50B formed by an angular velocity sensor 511B and A/D conversion circuit (not shown) etc.

The angular velocity sensor 511A is a sensor for detecting the angular velocity ω in the pitch direction and is provided with its angular velocity detection sensitivity axis in the X-direction (horizontal direction). The angular velocity sensor 511B is a sensor for detecting the angular velocity ω in the yaw direction and is provided with its angular velocity detection sensitivity axis in the Y-direction (vertical direction). A disturbance information output circuit 64, camera movement information output circuit 65, and antivibration mode selector 66 are also mounted on the board 25.

The angular velocity sensors 511A, 511B are weak against acceleration like disturbances occurring in directions perpendicular to their detection sensitivity axes compared with the directions of their detection sensitivity axes. In this case, if the quick return mirror 30 of the camera body 200 pivots in the arrow direction at the time of shooting, the drive vibration of the quick return mirror 30 is transmitted through the lens barrel 100 to the board 25 as a disturbance and is detected by the angular velocity sensor 511A. This detection signal is for example input as noise of about 150 Hz from the angular velocity sensor 511A to the first low pass filter (LPF) 52A. On the other hand, the pivot direction of the quick return mirror 30 corresponds to the direction of the detection sensitivity axis of the angular velocity sensor 511B, so the angular velocity sensor 511B does not detect drive vibration of the quick return mirror 30.

Embodiment 3

In the explanation of the above embodiments, the timing of input of the cut-off change signal to the first low pass filter (LPF) 52A was explained. Due to the configuration of the camera body 200, when mirror vibration is detected by the angular velocity sensor 51B (511B) detecting vibration in the yaw direction, it is sufficient to send the cut-off change signal to the second low pass filter (LPF) 52B rather than the first low pass filter (LPF) 52A. Further, when mirror vibration is detected by both of the angular velocity sensors 51A, 51B, it is sufficient to send the cut-off change signal to both of the low pass filters (LPF) 52A, 52B.

In the above explanation, the example assuming the frequency of the mirror vibration to be about 150 Hz and changing the cut-off frequency of the first low pass filter (LPF) 52A (52B) from 500 Hz to 50 Hz was shown, but the invention is not limited to this. The actual change of the cut-off frequency may be suitable change in accordance with the frequency of the mirror vibration. The cut-off frequency of the first low pass filter (LPF) 52A (52B) may be freely set so as to switch from a frequency higher than the frequency occurring when the quick return mirror is driven to a frequency lower than the frequency occurring when the quick return mirror is driven at for example the timing when the mechanical drive parts (quick return mirror etc.) are driven. The vibration occurring at the mechanical drive parts of an imaging device (quick return mirror, shutter, etc.) is for example a frequency higher than 100 Hz.

Further, the explanation was given with reference to the drive vibration of the quick return mirror 30 as the cause of the disturbance noise, but the present invention may also be applied to vibration during motion of the shutter curtains (front curtain and rear curtain) and vibration at the time of driving rotation of the AF motor when adjusting the focus. It is sufficient to set the cut-off frequencies so as to remove the frequency of vibrations (disturbance noise) in accordance with the frequency of vibration occurring when moving the shutter curtains or the frequency of the vibration occurring when driving rotation of the AF motor and change the cut-off frequency of the first low pass filter (LPF) 52A (52B) while the disturbance noise is produced.

When disturbance noises occur separately and independently in the pitch direction and yaw direction, it is sufficient to change the cut-off frequencies, of the first low pass filter (LPF) 52A and second low pass filter (LPF) 52B separately in parallel in the pitch direction and yaw direction.

Embodiment 4

Figure 7:
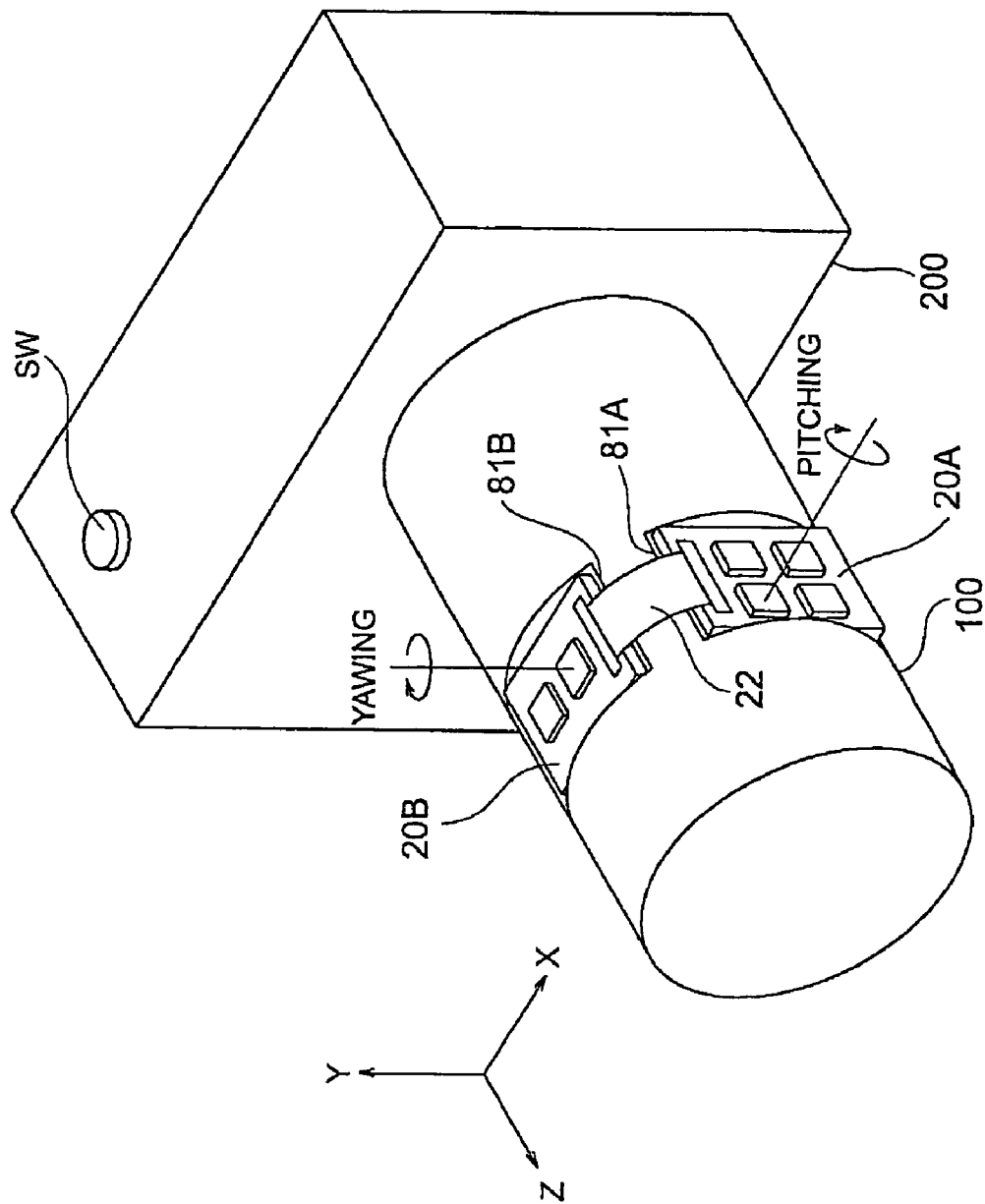
FIG. 7 is a schematic view of the outlines of a camera mounting an interchangeable lens of this embodiment.

FIG. 7 is a schematic view of an outline of a camera mounting a lens barrel of a fourth embodiment of the present invention. The camera of this embodiment is used with a lens barrel 100 mounted on a camera body 200.

The lens barrel 100 includes inside it a not shown imaging optical system. Part of the lenses forming the imaging optical system can move in a direction substantially perpendicular to the optical axis (Z-direction) and form the group of vibration reduction lenses for reducing vibration of an image by this movement. Further, the lens barrel 100 has inside it a later explained communication unit 97 for communicating with the camera body 200 and an AF drive unit 96 for moving the group of focus lenses in the imaging optical system in the optical axis direction in accordance with instructions from the camera body 200 (see FIG. 9).

Farther, the lens barrel 100 has a board 20A, board 20B, and board 22. The board 22 is for example a flexible printed circuit board having flexibility. The board 20A and board 20B are for example hard boards comprised of multiple layers of circuit interconnects. The board surfaces are substantially rectangular. The electrical circuits of the board 20A and the electrical circuits of the board 20B are connected through the electrical circuits of the board 22.

The board 20A is disposed in a direction so that the board surface becomes vertical (direction perpendicular to the X-direction) when the lens barrel 100 is mounted on the camera body 200 and the camera body 200 is correctly positioned in posture (usually direction where imaging screen becomes horizontal). The board 20B is disposed in a direction where the board surface becomes horizontal (direction perpendicular to Y-direction) when the camera body 200 is correctly positioned in posture. Therefore, the board 20A and the board 20B have board surfaces perpendicular to each other. The surface 81A directly mounts the board 20 without the interposition of a damper member etc. The surface 81B directly mounts the board 20B without the interposition of a damper member etc.

Figure 8:
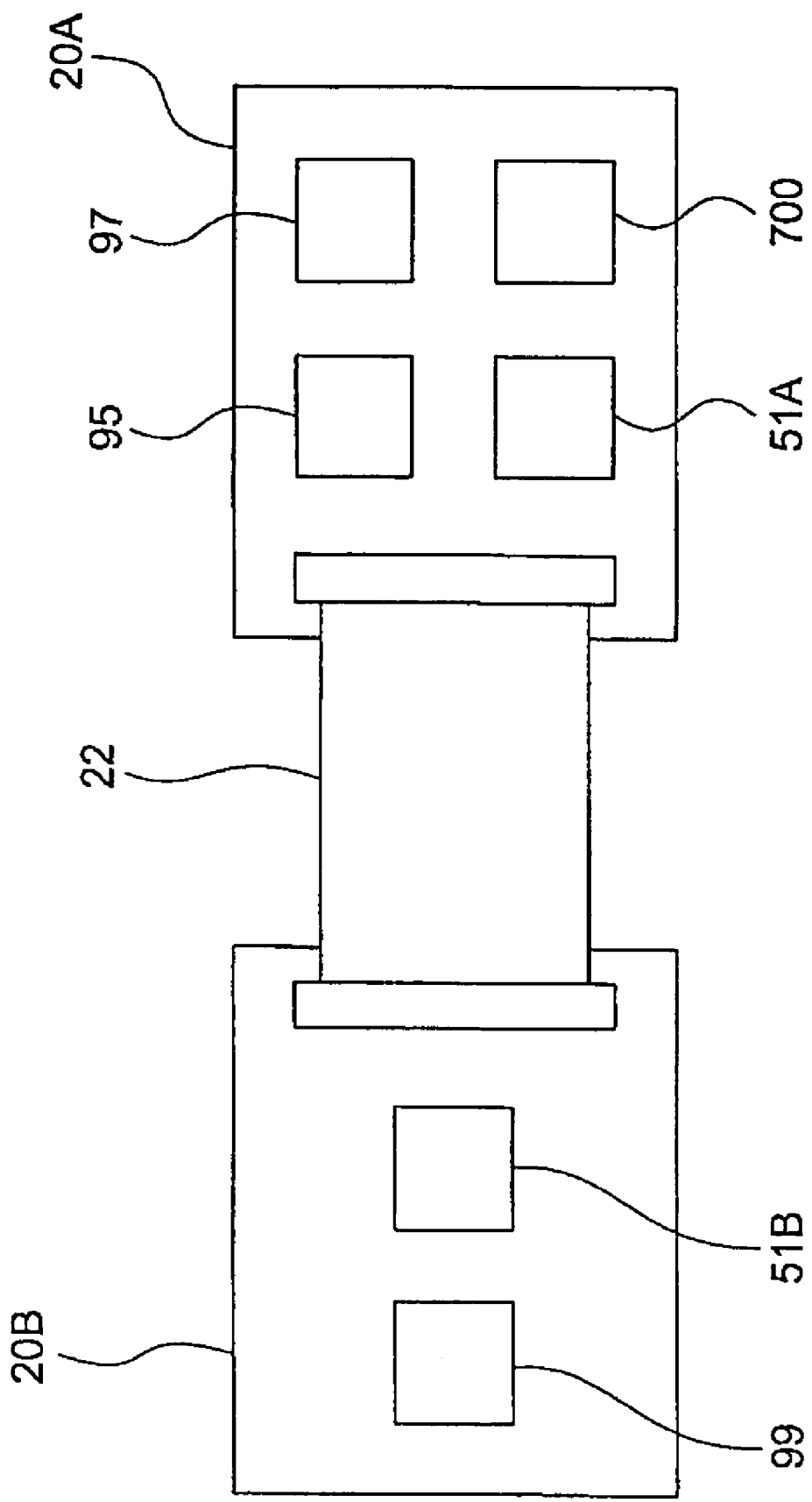
FIG. 8 is a view of a board 1, board 2, and board 3 spread out.
Figure 9:
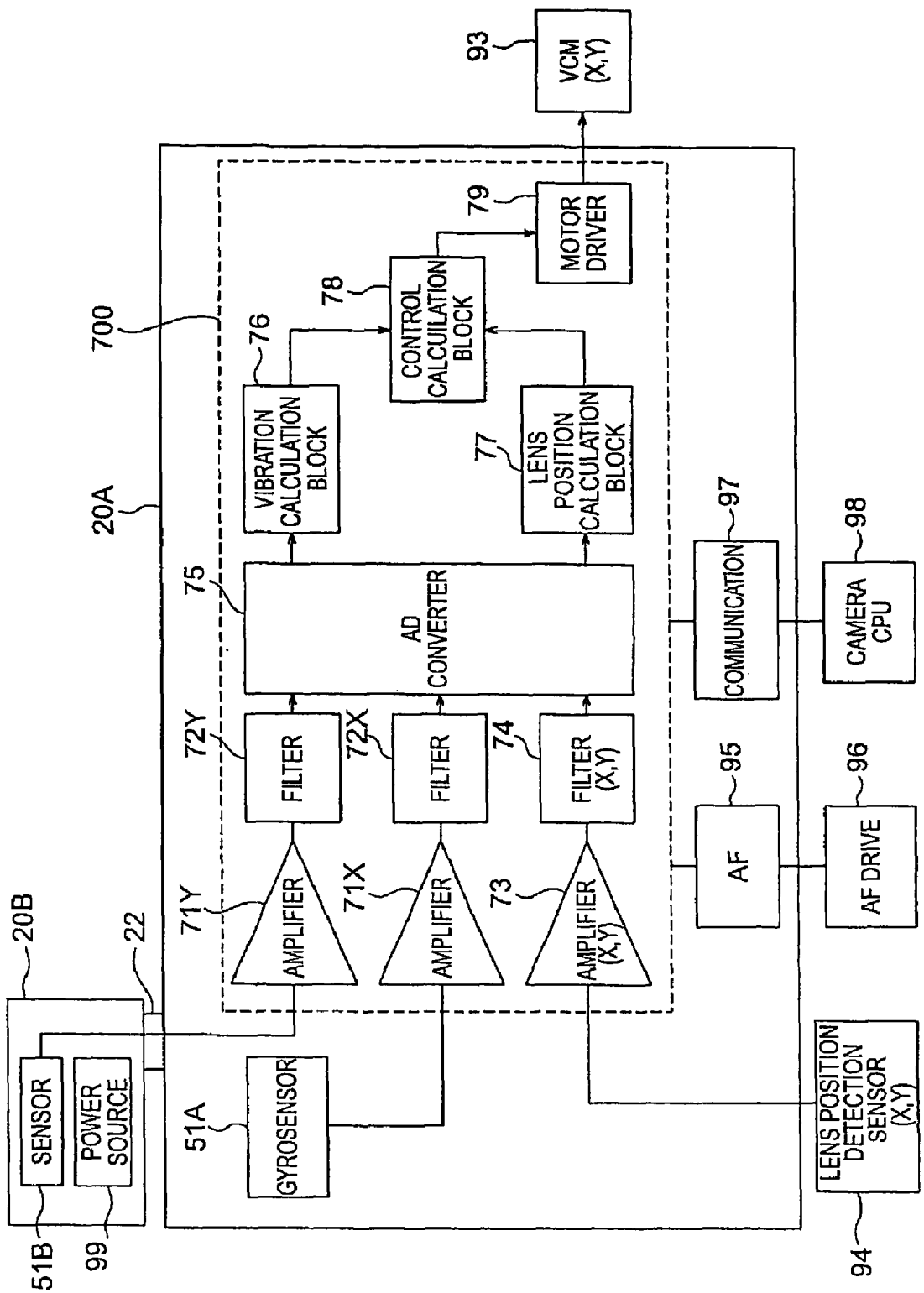
FIG. 9 is a block diagram showing details of circuits provided at the board 1, board 2, and board 3.

FIG. 8 is a view showing the board 20A, board 20B, and board 22 spread out. FIG. 9 is a block diagram showing the content of the circuits provided on the board 20A, board 20B, and board 22.

In FIG. 9, the board 20A has a VCM (voice coil motor) 93, lens position detection sensor 94, and AF drive unit 96 connected to it. The VCM 93 is an actuator for driving the vibration reduction lenses. The lens position detection sensor 94 is a sensor for detecting the position of the vibration reduction lenses.

Note that the VCM 93 and lens position detection sensor 94 are provided in the two perpendicularly intersecting X-direction and Y-direction, but in the following explanation, for simplification, the explanation is given combining these into one.

The AF drive unit 96 has an ultrasonic motor or other motor for driving the group of focus lenses and an encoder for detecting the position of the group of focus lenses and drives the group of focus lenses based on the instructions of the AF circuit 95.

Further, the board 20A is provided with a gyrosensor 51A, lens CPU 700, AF circuit 95, and communication circuit 97. On the other hand, the board 20B is provided with a gyrosensor 51B and power circuit 99. Note that the gyrosensor 51A, gyrosensor 51B, lens CPU 700, AF circuit 95, communication circuit 97, and power circuit 99 are respectively formed as chips which are mounted on the boards 20A, 20B.

The gyrosensor 51A is mounted on the board 20A and detects the angular velocity about a detection axis (X-axis) in a direction vertical to the board surface of the board 20A. Therefore, the gyrosensor 51 can detect vibration due to pitching of the lens barrel 100 (see FIG. 7). The vibration signal detected by the gyrosensor 51A is sent to the lens CPU 700.

The gyrosensor 51B is mounted on the board 20B and detects the angular velocity about a detection axis (Y-axis) in a direction vertical to the board surface of the board 20B. Therefore, the gyrosensor 51B can detect vibration due to yawing of the lens barrel 100 (see FIG. 7). The vibration signal detected by the gyrosensor 51B is sent to the lens CPU 700 through the board 22.

The lens CPU 700 is a processing circuit for controlling the operation of the lens barrel 100 and has amplifiers 71X, 71Y, 73, filters 72X, 72Y, 74, an AD converter 75, a vibration amount detection block 76, a lens position calculation block 77, a control calculation block 78, and a motor driver 79.

The amplifiers 71X, 71Y, 73 respectively amplify the signals obtained from the gyrosensor 51A, gyrosensor 51B, and lens position detection sensor 94 and send the results to the filters 72X, 72Y, 74.

The filters 72X, 72Y, 74 are circuits for removing the noise components from the signals sent from the amplifiers 71X, 71Y, and 73.

Note that FIG. 9 shows only the one system of the amplifier 73 and the filter 74, but in actuality one each is provided in the X-direction and Y-direction and perform processing separately for the signals from the lens position detection sensors 94 provided in the X-direction and Y-direction.

The AD converter 75 is a part for converting the analog signals obtained from the sensors to digital signals. The vibration calculation block 76 calculates the amount of vibration of the image at a not shown imaging plane due to vibration of the lens barrel 100 based on the signals obtained from the gyrosensor 51A and gyrosensor 51B. The lens position calculation block 77 calculates the position of the group of vibration reduction lenses based on the signal obtained from the lens position detection sensor 94.

The control calculation block 78 calculates the amount of movement, movement speed, etc. of the group of vibration reduction lenses required for reducing the vibration of the imaging at the imaging plane and other control amounts required for control of the drive operation of the group of vibration reduction lenses based on the information obtained from the vibration calculation block 76 and lens position calculation block 77 and transmits them to the motor driver 79. The motor driver 79 drives the VCM 93 in accordance with the control amount obtained from the control calculation block 78.

The AF circuit 95 is a circuit for obtaining position information of the group of focus lenses from the AF drive unit 96 and obtaining an instruction from the camera CPU 98 to instruct the drive operation of the group of focus lenses to the AF drive unit 96.

The communication circuit 97 is a circuit for communicating with the camera CPU 98 through not shown mount contacts. Note that the communication circuit 97 is connected to the mount contacts by a flexible board etc. The power circuit 99 is a part having a DC/DC converter etc. and adjusting the power used in the lens barrel 100 and is controlled by the camera CPU 98.

In the above way, all of the circuits required for the lens barrel 100 of the present embodiment are provided on the board 20A and board 20B. Therefore, it is not necessary like in the past to provide a special board for mounting the gyrosensor 51A and gyrosensor 51B and the interchangeable lenses can be made smaller in size.

Further, the board 20A and board 20B of the present embodiment have surfaces substantially rectangular in shape, so compared to the conventional arc-shaped boards designed for sensors, at the time of production of the boards, it is easy to obtain a large number of boards from a single board and the production efficiency can be raised.

According to the present invention, it is possible to provide a small sized lens barrel, interchangeable lens, and camera.

Further, the gyrosensor 51A of this embodiment is mounted on the same board 20A as the lens CPU 700 having the AD converter 75, while the gyrosensor 51B is mounted on the board 20B arranged near the board 20A. Therefore, the distance from the gyrosensor 51A and gyrosensor 51B to the AD converter 75 is short and entry of noise due to transmission of analog signals over a long distance can be prevented.

Still further, the board 20A and board 20B are hard boards. No damper members are provided between the surface 81A and the board 20A, so fastening to the lens barrel 100 becomes easy and the fastened posture can be maintained without being affected by environmental changes etc. Therefore, the directions in which these mounted gyrosensor 51A and gyrosensor 51B are fastened can be easily and accurately made the accurate mounting states, the mounting state can be made stabler, and vibration can be detected with a high precision.

Modifications

The present invention is not limited to the embodiments explained above and can be modified and changed in various ways. These are also in the range of equivalents of the present invention. For example, inventions combining the above-mentioned embodiments 1 to 4 and the later explained modifications also fall within the range of the present invention.

(1) In the above embodiments, an optical device was explained using a camera system including a camera body and a lens barrel, but the invention is not limited to this. For example, it may also be applied to various optical devices detecting vibration on the one hand and having sources of vibration causing disturbance noise on the other hand. Specifically, it may also be applied to a camera of a built-in lens type where the lens barrel and lens cannot be detached from the imaging device and other imaging parts, a video camera, telescope, binoculars, field scope, microscope, mobile phone, etc.

(2) In Embodiment 4, the example of providing all of the circuits for the signal processing of the gyrosensor 51B on the board 20A was shown, but the invention is not limited to this. For example, it is also possible to provide part or all of the circuits for the signal processing of the gyrosensor 51B on the board 20B.

(3) In the above embodiments, the example of the board 20A and the board 20B being alternately arranged around the optical axis was shown, but the invention is not limited to this. It is also possible to arrange them suitably with angles in accordance with the layout requirements. The positions of arrangement are also not limited to ones around the optical axis.

(4) The camera body 200 may be a digital camera using a CCD, CMS, or other such amplification type solid-state imaging device as a photosensitive member or a silver-salt film camera using film as a photosensitive member.

(5) Further, in the above-mentioned embodiments, the explanation was given with reference to the example of reducing hand-shake by driving a hand-shake reduction optical system, but the invention is not limited to this. For example, the invention can also be applied to a case of moving the imaging device in accordance with the vibration detected by the gyrosensors to reduce hand-shake, a case of performing image processing using software in accordance with the vibration detected by the gyrosensors to reduce hand-shake, a case of reducing vibration occurring when using a camera attached to a tripod, and a case of reducing vibration using not gyrosensors, but acceleration etc.

While the invention has been described with reference to specific embodiments chosen for purpose of illustration, it should be apparent that numerous modifications could be made thereto by those skilled in the art without departing from the basic concept and scope of the invention.

The invention claimed is:

1. An optical device comprising:
a processing unit that outputs a driving signal in accordance with an operation of a full depression switch;
a mirror part driven in response to said driving signal;
a vibration detection sensor that outputs a detection signal corresponding to a detected vibration;
a low pass filter that filters said detection signal in accordance with a cut-off frequency; and
a controller that changes said cut-off frequency of said low pass filter at a timing when said mirror part is driven in accordance with said driving signal output from said processing unit, wherein
said vibration detection sensor is mounted on said optical device without interposition of a damper member that absorbs vibration,
said controller changes said cut-off frequency from a first frequency higher than a frequency of vibration occurring at said optical device when said mirror part is driven, to a second frequency lower than said frequency of vibration occurring at said optical device when said mirror part is driven, at a timing when said mirror part is driven before starting an exposure, and
said controller changes said cut-off frequency from said second frequency to said first frequency before a predetermined time prior to starting said exposure and keeps said first frequency until finishing said exposure.

2. The optical device as set forth in claim 1, wherein
said cut-off frequency of said low pass filter is switched from a third frequency higher than a frequency of hand-shake and higher than said frequency occurring when said mirror part is driven, to a fourth frequency higher than a frequency of hand-shake and lower than said frequency occurring when said mirror part is driven, at a timing when said mirror part is driven.

3. The optical device as set forth in claim 1, wherein
said cut-off frequency of said low pass filter is switched from a frequency of 100 Hz or more to a frequency of 50 Hz or less.

4. The optical device as set forth in claim 1, wherein
said controller sends an on/off signal that changes said cut-off frequency of said low pass filter to said low pass filter.

5. The optical device as set forth in claim 1, wherein
said vibration detection sensor includes a first angular velocity sensor that detects vibration in a first direction and a second angular velocity sensor that detects vibration in a second direction perpendicular to said first direction,
said low pass filter includes a first low pass filter that filters said detection signal output from said first angular velocity sensor and a second low pass filter that filters said detection signal output from said second angular velocity sensor, and
said controller can separately change said cut-off frequencies of said first low pass filter and said second low pass filter.

6. The optical device as set forth in claim 5, wherein
said controller changes said cut-off frequency of one of said first low pass filter and said second low pass filter.

7. The optical device as set forth in claim 1, wherein
said controller changes said cut-off frequency of said low pass filter when said detection signal includes noise.

8. The optical device as set forth in claim 1, wherein
said vibration detection sensor is an angular velocity sensor and is provided with a mounting part that mounts to a board in a direction perpendicular to an angular velocity detection sensitivity axis.

9. The optical device as set forth in claim 8, further comprising a lens barrel, wherein
said angular velocity sensor is mounted on said board, and
said board is fixed to said lens barrel so that said angular velocity detection sensitivity axis of said vibration detection sensor is perpendicular to an optical axis of said lens barrel.

10. The optical device as set forth in claim 1, wherein
said mirror part is a mirror controlling whether or not to reflect imaging light, or a shutter passing said imaging light at said predetermined timing, and
said controller changes said cut-off frequency of said low pass filter at a timing when said mirror is driven or a timing when said shutter is driven.

11. A method of detection of vibration using the optical device set forth in claim 1, comprising the steps of:
detecting said vibration and outputting said detected vibration to a filtering unit;
using said filtering unit to filter said detected vibration by a first cut-off frequency; and
using said filtering unit to filter said detected vibration by a second cut-off frequency different from said first cut-off frequency.

12. The method of detection of vibration as set forth in claim 11, wherein said second cut-off frequency is lower than said first cut-off frequency.

13. The method of detection of vibration as set forth in claim 11, further including a step of filtering by said first cut-off frequency after the step of using said filtering unit to filter said detected vibration by said second cut-off frequency.

14. The optical device as set forth in claim 1, further comprising a lens barrel, wherein
said vibration detection sensor includes a first angular velocity sensor that detects vibration in a first direction and a second angular velocity sensor that detects vibration in a second direction crossing to said first direction,
said first angular velocity sensor is mounted on a first board,
said first board is fixed to said lens barrel so that a first angular velocity detection sensitivity axis of said first vibration detection sensor is perpendicular to an optical axis of said lens barrel,
said second board is fixed to said lens barrel so that a second angular velocity detection sensitivity axis of said second vibration detection sensor is perpendicular to said optical axis of said lens barrel, and
said first and second boards are provided so that directions of said first and second boards cross to each other, and provided in parallel to said optical axis of said lens barrel.

15. The optical device as set forth in claim 14, wherein
any one of said first board and said second board is provided with a conversion circuit that converts said detection signal to a digital signal, and
the other one of said first board and said second board is provided with a power circuit.

16. The optical device as set forth in claim 14, wherein
said first board and said second board are connected through a flexible board.

17. The optical device as set forth in claim 14, wherein
said low pass filter is mounted on at least one of said first board and said second board.

18. The optical device as set forth in claim 1, wherein
said controller changes said cut-off frequency from said first frequency to said second frequency at said timing when said mirror part is driven after finishing said exposure, and changes said cut-off frequency from said second frequency to said first frequency after a predetermined time from termination of driving said mirror part.

19. The optical device as set forth in claim 1, further comprising:
a power circuit that supplies power for operating said vibration detection sensor;
a conversion circuit that converts said detection signal to a digital signal;
a first board provided with said power circuit; and
a second board provided with said conversion circuit, wherein
said first and second boards are provided so that directions of said first and second boards cross to each other, and
said vibration detection sensor includes a first angular velocity sensor that is mounted on said first board and detects a first angular velocity signal corresponding to an angular velocity in a first direction vertical to said first board, and a second angular velocity sensor that is mounted on said second board and detects a second angular velocity signal corresponding to an angular velocity in a second direction vertical to said second board.

20. An optical device comprising:
a vibration detection sensor that outputs a detection signal corresponding to a detected vibration, a low pass filter that filters said detection signal in accordance with a cut-off frequency, and a controller that changes the cut-off frequency of said low pass filter at a timing when a mirror part is driven in accordance with an operation of a photographer, wherein said controller changes the cut-off frequency from a first frequency higher than a frequency of vibration occurring at the optical device when said mirror part is driven, to a second frequency lower than a frequency of vibration occurring at the optical device when said mirror part is driven, at the timing when said mirror part is driven before starting an exposure, and said controller changes the cut-off frequency from the second frequency to the first frequency before a predetermined time prior to starting the exposure and keeps the first frequency until finishing the exposure.

21. The optical device as set forth in claim 20, further comprising an optical system that moves for compensating image blurring.

22. The optical device as set forth in claim 20, further comprising an imaging portion that moves for compensating image blurring.

23. The optical device as set forth in claim 20, further comprising a vibration reduction portion that performs image processing for compensating image blurring.

24. The optical device as set forth in claim 20, further comprising an imaging portion that can take a still image.

25. The optical device as set forth in claim 20, further comprising an imaging portion that can take a moving image.

* * * * *